(12) United States Patent
Okayama et al.

(10) Patent No.: US 6,466,920 B1
(45) Date of Patent: Oct. 15, 2002

(54) METHOD AND SYSTEM FOR PREVENTING ILLEGAL USE OF DIGITAL CONTENTS, PROCESSING PROGRAM THEREOF, AND RECORDING MEDIUM FOR THE PROGRAM

(75) Inventors: Nobuya Okayama, Kawasaki; Hiroshi Koike, Maebashi; Taminori Tomita, Yokohama; Shigeru Arai, Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/473,275

(22) Filed: Dec. 28, 1999

(30) Foreign Application Priority Data

Dec. 28, 1998 (JP) .......................... 10-373649

(51) Int. Cl.[7] .............................................. G06F 17/00
(52) U.S. Cl. ......................................... 705/57; 380/201
(58) Field of Search ................................ 380/277, 278, 380/284, 201, 202, 203; 713/200, 201; 705/57, 58; 709/226, 229; 369/47.12, 14, 53.21; 365/185.04

(56) References Cited

U.S. PATENT DOCUMENTS

| | | | | | |
|---|---|---|---|---|---|
| 4,654,799 A | * | 3/1987 | Ogaki et al. | ................ | 364/479 |
| 5,327,563 A | * | 7/1994 | Singh | .......................... | 395/700 |
| 5,388,211 A | * | 2/1995 | Hornbuckle | ................. | 395/200 |
| 5,886,979 A | * | 3/1999 | Moribe et al. | ........... | 369/275.3 |
| 6,195,432 B1 | * | 2/2001 | Takahashi et al. | .............. | 380/9 |
| 6,226,785 B1 | * | 5/2001 | Peterson et al. | ................ | 717/2 |
| 6,266,271 B1 | * | 7/2001 | Kawamura | ............. | 365/185.04 |

FOREIGN PATENT DOCUMENTS

| | | | |
|---|---|---|---|
| JP | 1049583 | | 2/1998 |
| JP | 10254850 | | 9/1998 |
| JP | 02001217865 A | * | 8/2001 |
| WO | WO9641449 | * | 6/1996 |

OTHER PUBLICATIONS

Derwent–Acc–No.: 2001–314778; Ichihara, S et al.; Jul. 2000.*

* cited by examiner

*Primary Examiner*—James P. Trammell
*Assistant Examiner*—Pierre E. Elisca
(74) *Attorney, Agent, or Firm*—Antonelli, Terry, Stout & Kraus, LLP.

(57) ABSTRACT

In a method of preventing an illegal use of digital contents, a status information for controlling the replay processing of the digital contents is set in the digital contents. The replay processing of the digital contents is controlled in accordance with a value of the status information thus set. Thereby, a technique can be provided which is capable of preventing the illegal use of the digital contents within the various types of shopping centers and retail outlets.

6 Claims, 10 Drawing Sheets

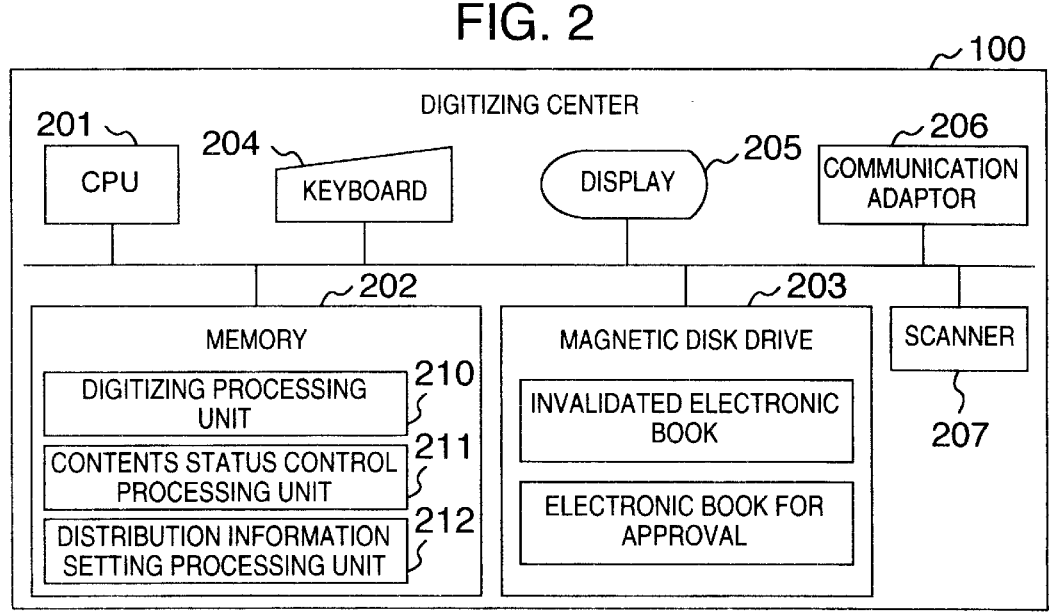
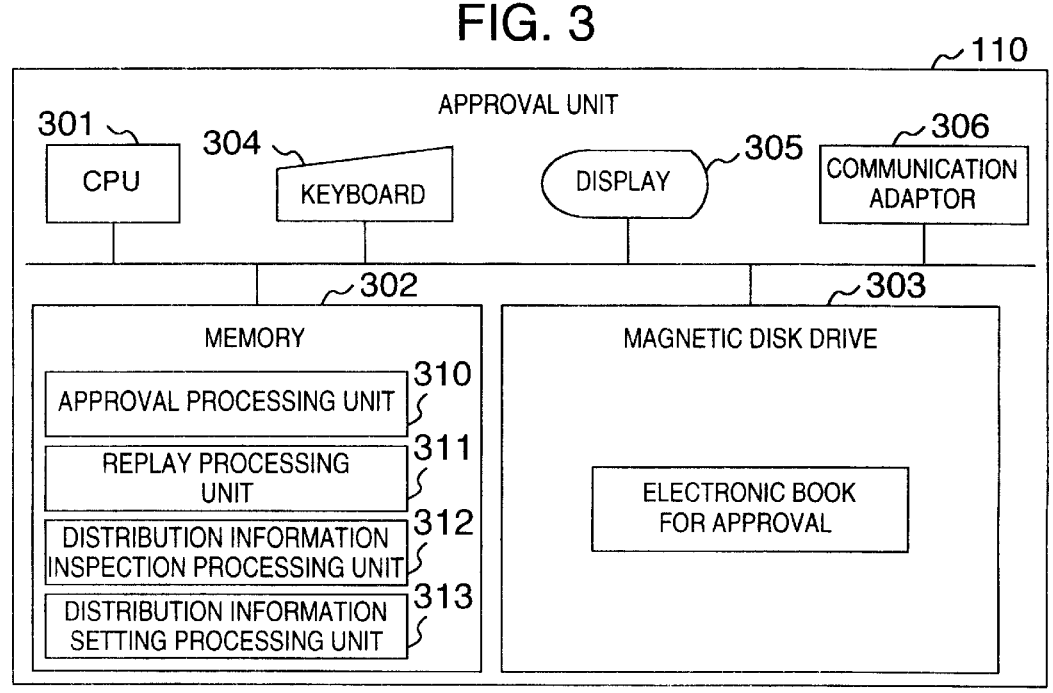

METHOD AND SYSTEM FOR PREVENTING ILLEGAL USE OF DIGITAL CONTENTS, PROCESSING PROGRAM THEREOF, AND RECORDING MEDIUM FOR THE PROGRAM

CROSS-REFERENCES TO RELATED APPLICATIONS

This application is related to application Ser. No. 09/473,278, filed by K. Igawa et al on Dec. 28, 1999, corresponding to Japanese Patent Application No. 10-372543, filed on Dec. 28, 1998, and the content of which is incorporated herein by reference in its entirety.

This application is related to application Ser. No. 091473,298, filed by N. Okayama et al on Dec. 28, 1999, corresponding to Japanese Patent Application No. 10-373650, filed on Dec. 28, 1998, and the content of which is incorporated herein by reference in its entirety.

This application is related to application Ser. No. 09/473,277, filed by H. Koike et al on Dec. 28, 1999, corresponding to Japanese Patent Application No. 10-373651, filed on Dec. 28, 1998, and the content of which is incorporated herein by reference in its entirety.

BACKGROUND OF THE INVENTION

The present invention relates to a system for preventing the illegal use of digital contents, or more in particular to a technique effectively applicable to such a system by prohibiting the use of digital contents which may be illegally copied, removed or downloaded in the various types of shopping centers or retail outlets engaged in processing the digital contents.

With the recent progress of electronic commercial transactions on the internet, the on-line sales of digital contents have begun to spread, and demand is growing for an infrastructure for conducting commercial transactions in what is called the four flows (sales promotion, spread of trade, flow of money and flow of commodities) with digital information. Especially for the distribution of digital contents, an infrastructure is required to establish a method of preventing the illegal use and protect the copyright of digital contents.

The techniques for distributing information safely on a network include those for preventing information leakage, preventing the alteration and evidencing the origin. A secure socket such as SSL (Secure Socket Layer) is known in which the contents on the communication route are encrypted between two points for preventing leakage, and a secure container is also known in which contents are encrypted and electronically signed.

The conventional techniques described above are intended to secure the safety of the distribution between two points by encrypting the information when it is distributed in the network. Accordingly, the applications of these techniques for protecting the digital contents in the recorded state and for preventing the illegal use within the various types of shopping centers or retail outlets are difficult, or the load of the encryption process for the large size digital contents is large.

In order to prevent the illegal use of digital contents after sales, it is necessary to generate personal digital contents permitting the use only by specific customers. Consider the application of the conventional technique to the case where digital contents are sold to a customer at a retail outlet after being distributed thereto from a storage management center. The storage management center where the purchasing customer is not specified cannot generate any personal digital contents, so that the different encryption processes are required for the distribution from the storage management center to the retail outlet and the sales from the retail outlet to the customer. Thereby, the load of the encryption process is larger.

SUMMARY OF THE INVENTION

An object of the present invention is to solve the above-mentioned problems and to provide a technique capable of preventing the illegal use of digital contents within the various types of shopping centers and retail outlets.

According to an aspect of the present invention, there is provided a system for preventing an illegal use of digital contents, wherein a replay processing of digital contents is controlled in accordance with a value of status information set in the digital contents. Thereby, it is possible to prevent the illegal use of digital contents.

In another aspect of the present invention, digital contents are generated by digitizing an original of contents, status information for prohibiting a replay process of all the generated digital contents is set in the generated digital contents to generate a invalidated version of digital contents, and the invalidated version of digital contents are stored.

In obtaining the approval of a contents holder owning the original of the contents to the contents of the generated digital contents, the status information of the invalidated version of digital contents is set to a value for permitting the replay processing by the contents holder to generate digital contents for approval and to transmit it to an approval unit of the contents holder.

The approval unit of the contents holder checks whether the status information set in the digital contents for approval indicates the value for permitting the replay processing by the contents holder. In the case where it is the value for permitting the replay processing, the approval unit performs the replay processing.

The digital contents approved in the way described above are stored in a storage management unit in the form of the invalidated version of digital contents, and then are distributed to vending machines. The encryption processing may be used for distributing the invalidated version of digital contents from the storage management unit to the vending machines over a wide area.

When the digital contents distributed to the vending machines are sold to a customer, the status information of the invalidated version of digital contents is set to the value for permitting the replay processing by the customer. Thereby, personal digital contents are generated and are sold to the customer.

A replay unit of the customer checks whether the status information set in the personal digital contents assumes the value for permitting the replay processing by the particular customer. Only in the case where the value permits the replay processing, the replay unit performs the replay processing.

As described above, according to the present invention, the digital contents are stored in the form of the invalidated version. Further, when the invalidated version of digital contents is validated, they are validated only for the specific user. Therefore, one who is not permitted to use them cannot read and use their contents even if he or she succeeds in copying, removing or downloading them. Also, the replay processing of the digital contents is controlled in accordance with the value of the status information set in the digital contents. Therefore, the user permitted to replay can be easily changed by changing the value of the status information of the digital contents for the benefit of the contents holder or a customer.

According to the system for preventing the illegal use of digital contents according to the present invention, the replay processing of the digital contents is controlled in accordance with the value of the status information set in the digital contents. Therefore, the illegal use of the digital contents within the various types of shopping centers and retail outlets can be prevented.

BRIEF DESCRIPTION OF THE DRAWINGS

FIG. 2 is a diagram showing a general configuration of a digitizing unit 100 according to the embodiment.

FIG. 3 is a diagram showing a general configuration of an approval unit 110 according to the embodiment.

DESCRIPTION OF THE PREFERRED EMBODIMENTS

An explanation will be given below on the following system. In the system for preventing the illegal use of digital contents according to an embodiment, a status information for controlling the display of an electronic book generated by digitizing a book is set in the particular electronic book. The display of the particular electronic book is limited by the status information in order to prevent the illegal use of the electronic book.

Figure 1:
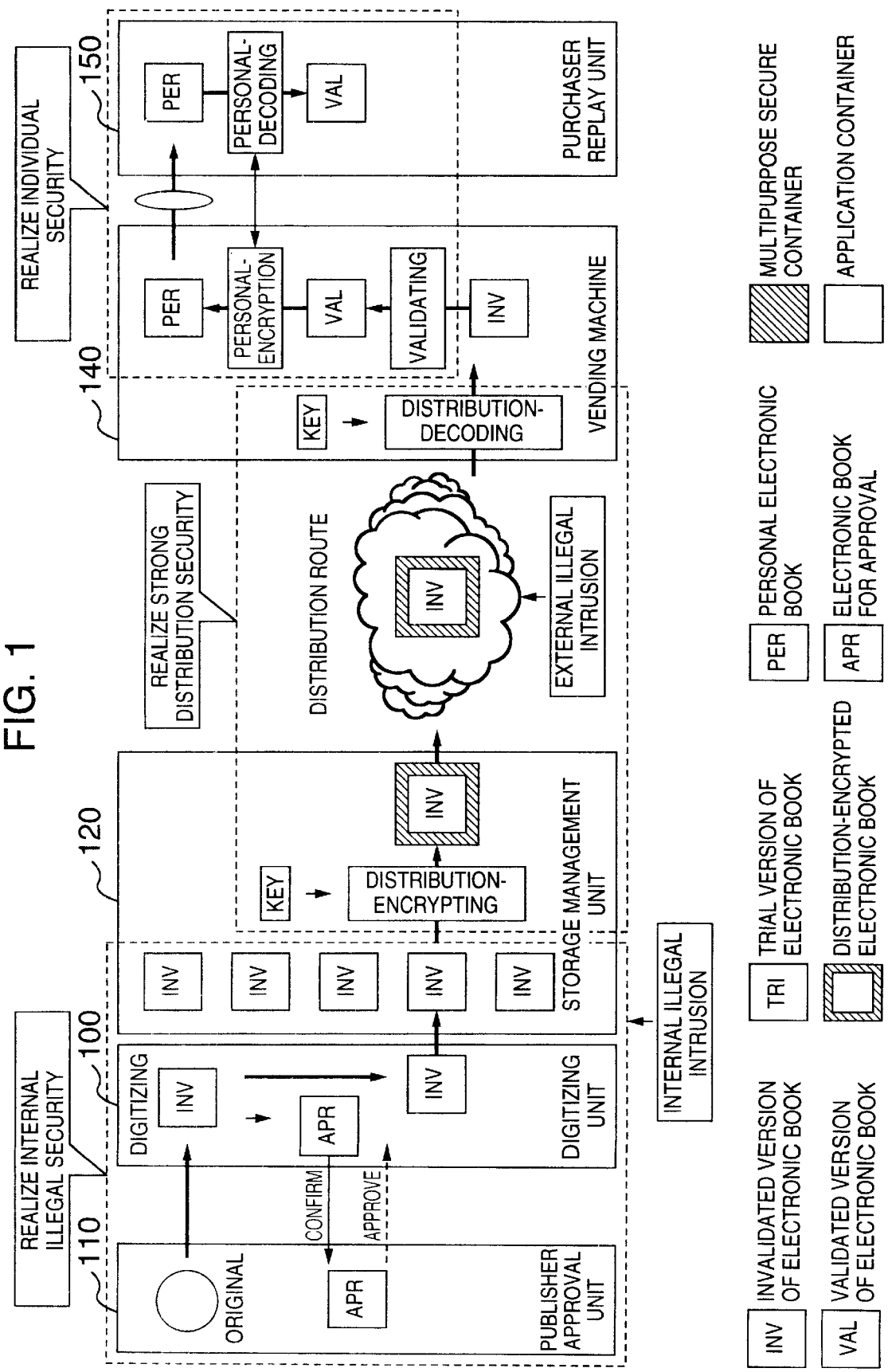
FIG. 1 is a diagram showing a general configuration of a digital contents distribution system according to an embodiment.

FIG. 1 is a diagram showing a general configuration of a digital contents distribution system according to the embodiment. As shown in FIG. 1, the digital contents distribution system according to the embodiment includes a digitizing unit 100, an approval unit 110, a storage management unit 120, a vending machine 140 and a replay unit 150.

The digitizing unit 100 generates an electronic book by digitizing an original book, receives an approval message from the approval unit 110, and sends the digitized book to the storage management unit 120. The approval unit 110 is a unit for approving the contents of the electronic book, which is generated by the digitizing unit 100, on the part of the publisher.

The storage management unit 120 is a unit for storing the electronic books generated by the digitizing unit 100. The vending machine 140 is a unit for copying the electronic book selected by the customer to a medium or downloading it to the replay unit 150 to sell the electronic book to the customer. The replay unit 150 is a unit for replaying the electronic book purchased from the ending machine 140.

In FIG. 1, an invalidated version of electronic book is an electronic book in which a status information for prohibiting the replay by any user is set. A validated version of electronic book is an electronic book in which a status information for permitting the replay by a specific user is set. A trial version of electronic book is an electronic book in which a status information for permitting a specific user to replay the electronic book for a specific period is set.

A distribution-encrypted electronic book is an invalidated version of electronic book encrypted for distribution. A personal electronic book is an electronic book in which a status information for permitting a specific person to replay the electronic book is set. An electronic book for approval is an electronic book in which a status information for permitting the replay by a specific publisher is set.

The invalidated version of electronic book, the validated version of electronic book, the trial version of electronic book, the personal electronic book, the electronic book for approval shown in FIG. 1 are generated in the format defined by an application program for replaying an electronic book. Further, each of them constitutes an application container described in an intermediate language or in binary notation.

FIG. 2 is a diagram showing a general configuration of the digitizing unit 100 according to the embodiment. As shown in FIG. 2, the digitizing unit 100 according to the embodiment includes a CPU 201, a memory 202, a magnetic disk drive 203, a keyboard 204, a display unit 205, a communication adaptor 206 and a scanner 207.

The CPU 201 is a control unit for controlling the whole operation of the digitizing unit 100. The memory 202 is a storage unit for loading the various types of processing programs and data for controlling the operation of the digitizing unit 100. The magnetic disk drive 203 is a storage unit for storing the various types of programs mentioned above and data of electronic books and so forth.

The keyboard 204 is an input device for inputting operating instructions and so forth to the digitizing unit 100. The display unit 205 is an output device for displaying the operating conditions of the digitizing unit 100 and so forth. The communication adaptor 206 is an adaptor for communicating with other devices. The scanner 207 is a device for reading the original book as image data.

The digitizing unit 100 further includes a digitizing processing unit 210, a contents status control processing unit 211 and a distribution information setting processing unit 212.

The digitizing processing unit 210 is a processing unit for generating the electronic book by digitizing the original book, and requesting the approval unit 110 to approve the contents thereof. The contents status control processing unit 211 is a processing unit for setting a status information for controlling the replay of the generated electronic book in the generated electronic book to generate the invalidated version of electronic book or the electronic book for approval. The distribution information setting processing unit 212 a processing unit for setting a distribution information, which indicates that the electronic book is digitized by the digitizing unit 100 of the digitizing center, in the generated electronic book for approval.

The programs for enabling the digitizing unit 100 to function as the digitizing processing unit 210, the contents status control processing unit 211 and the distribution information setting processing unit 212 are recorded in a recording medium such as a CD-ROM, stored in a magnetic disk and so forth, and then are loaded in a memory for execution. The medium for recording the programs is not limited to the CD-ROM but may be other recording means.

FIG. 3 is a diagram showing a general configuration of the approval unit 110 according to the embodiment. As shown in FIG. 3, the approval unit 110 according to the embodiment includes a CPU 301, a memory 302, a magnetic disk drive 303, a keyboard 304, a display unit 305 and a communication adaptor 306.

The CPU 301 is a control unit for controlling the whole operation of the approval unit 110. The memory 302 is a storage unit for loading the various types of processing programs and data for controlling the operation of the approval unit 110. The magnetic disk drive 303 is a storage unit for storing various programs mentioned above and data of electronic books and so forth.

The keyboard 304 is an input device for inputting operating instructions and so forth to the approval unit 110. The display unit 305 is an output device for displaying the operating conditions of the approval unit 110 and so forth. The communication adaptor 306 is an adaptor for communicating with other devices.

The approval unit 110 further includes an approval processing unit 310, a replay processing unit 311, a distribution information inspection processing unit 312 and a distribution information setting processing unit 313.

The approval processing unit 310 is a processing unit for receiving the electronic book for approval the contents of which the digitizing unit 100 requests to check, and for setting an approval information in the electronic book for approval, which indicates whether the contents of the electronic book is approved or not, to transmit the result to the digitizing unit 100.

The replay processing unit 311 is a processing unit for displaying the contents of the electronic book for approval when the status information set in the electronic book for approval indicates a value for permitting the replay processing by the approval unit 110. The distribution information inspection processing unit 312 is a processing unit for permitting the approval processing by the approval unit 110 when a distribution information of the electronic book for approval indicates a regular distribution route. The distribution information setting processing unit 313 is a processing unit for setting the distribution information, which indicates that the approval is granted in the approval unit 110 of the publisher, in the approved electronic book for approval.

The programs for enabling the approval unit 100 to function as the approval processing unit 310, the replay processing unit 311, the distribution information inspection processing unit 312 and the distribution information setting processing unit 313 are recorded in a recording medium such as a CD-ROM, stored in a magnetic disk and so forth, and then are loaded in a memory for execution. The medium for recording the programs is not limited to the CD-ROM but may be other recording means.

Figure 4:
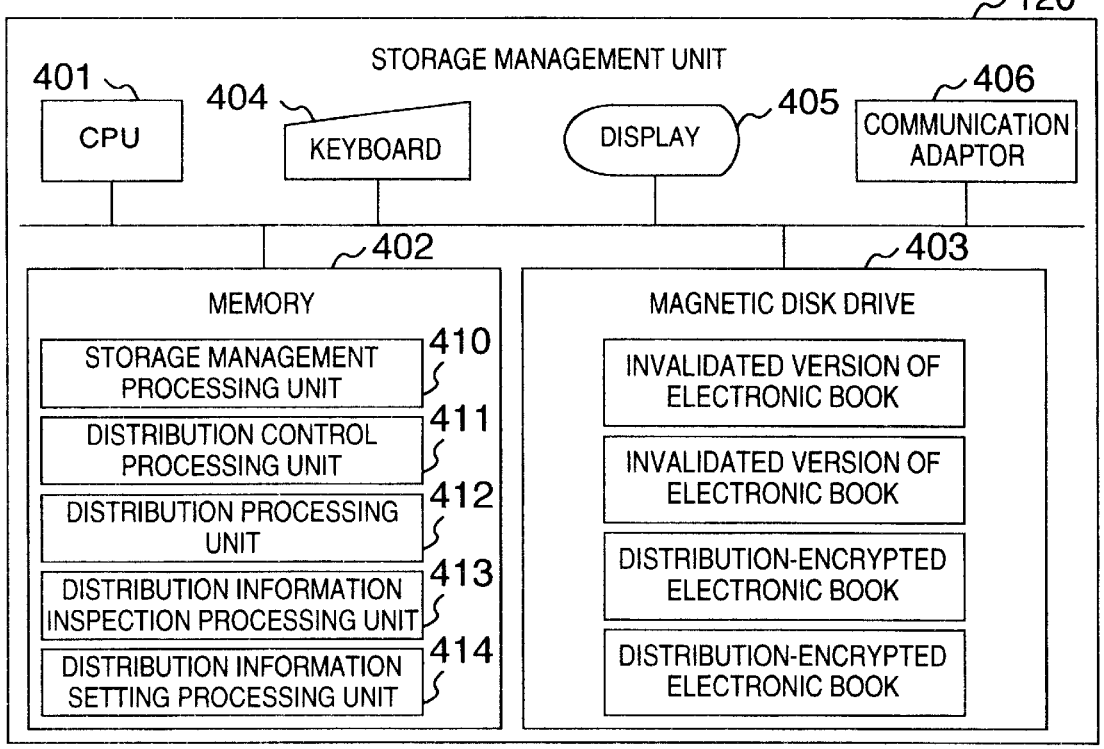
FIG. 4 is a diagram showing a general configuration of a storage management center 120 according to the embodiment.

FIG. 4 is a diagram showing a general configuration of the storage management unit 120 according to the embodiment. As shown in FIG. 4, the storage management unit 120 according to the embodiment includes a CPU 401, a memory 402, a magnetic disk drive 403, a keyboard 404, a display unit 405 and a communication adaptor 406.

The CPU 401 is a control unit for controlling the whole operation of the storage management unit 120. The memory 402 is a storage unit for loading the various types of processing programs and data for controlling the operation of the storage management unit 120. The magnetic disk drive 403 is a storage unit for storing the various types of processing programs mentioned above and data of electronic books and so forth.

The keyboard 404 is an input device for inputting operating instructions and so forth to the storage management unit 120. The display unit 405 is an output device for displaying the operating conditions of the storage management unit 120 and so forth. The communication adaptor 406 is an adaptor for communicating with other devices.

The storage management unit 120 further includes a storage management processing unit 410, a distribution control processing unit 411, a distribution processing unit 412, a distribution information inspection processing unit 413 and a distribution information setting processing unit 414.

The storage management processing unit 410 is a processing unit for receiving the invalidated version of electronic book generated in the digitizing unit 100 to store it in the magnetic disk drive 403. The distribution control processing unit 411 is a processing unit for performing an encrypting processing for distribution to the invalidated version of electronic book to generate a distribution-encrypted electronic book and to instruct the distribution thereof to the distribution processing unit 412.

The distribution processing unit 412 is a processing unit for distributing the distribution-encrypted electronic book generated by the distribution control processing unit 411 to the vending machine 140. The distribution information inspection processing unit 413 is a processing unit for permitting the storage management unit 120 to perform the storage processing when the distribution information of the invalidated version of electronic book indicates the regular distribution route. The distribution information setting processing unit 414 is a processing unit for setting the distribution information, which indicates that the invalidated version of electronic book is stored in the storage management unit 120 of the storage management center, in the received invalidated version of electronic book.

The programs for enabling the storage management unit 120 to function as the storage management processing unit 410, the distribution control processing unit 411, the distribution processing unit 412, the distribution information inspection processing unit 413 and the distribution information setting processing unit 414 are recorded in a recording medium such a CD-ROM, stored in a magnetic disk and so forth, and then are loaded in a memory for execution. The medium for recording the program is not limited to the CD-ROM but may be other recording means.

Figure 5:
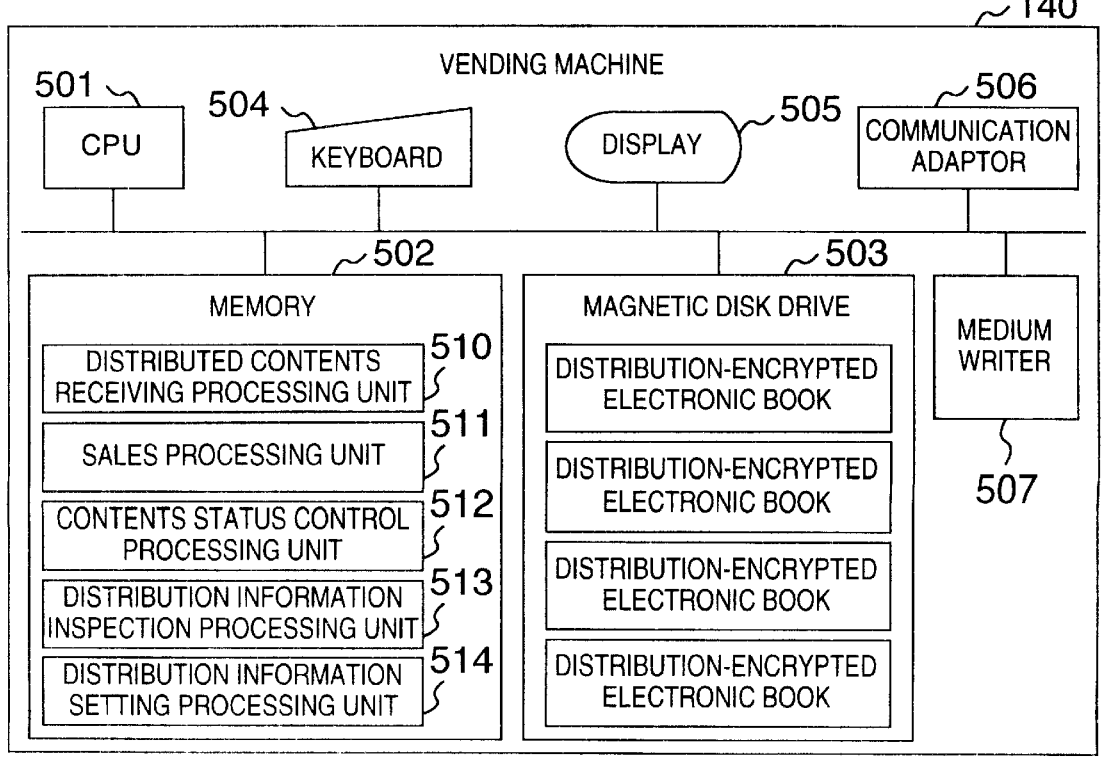
FIG. 5 is a diagram showing a general configuration of a vending machine 140 according to the embodiment.

FIG. 5 is a diagram showing a general configuration of the vending machine 140 according to the embodiment. As shown in FIG. 5, the vending machine 140 according to the embodiment includes a CPU 501, a memory 502, a magnetic disk drive 503, a keyboard 504, a display unit 505, a communication adaptor 506 and a medium writer 507.

The CPU 501 is a control unit for controlling the whole operation of the vending machine 140. The memory 502 is a storage unit for loading the various types of processing programs and data for controlling the operation of the vending machine 140. The magnetic disk drive 503 is a storage unit for storing the various types of processing programs mentioned above and data of electronic books and so forth.

The keyboard 504 is an input device for inputting operating instructions and so forth to the vending machine 140. The display unit 505 is an output device for displaying the operating conditions of the vending machine 140 and so forth. The communication adaptor 506 is an adaptor for communicating with other devices. The medium writer 507 is a device for writing a selected electronic book in a medium.

The vending machine 140 further includes a distributed contents receiving processing unit 510, a sales processing unit 511, a contents status control processing unit 512, a distribution information inspection processing unit 513 and a distribution information setting processing unit 514.

The distributed contents receiving processing unit 510 is a processing unit for receiving the distribution-encrypted electronic book distributed from the storage management unit 120 to store it in the magnetic disk drive 503. The sales processing unit 511 is a processing unit for converting a specific distribution-encrypted electronic book selected from the distributed distribution-encrypted electronic books into the personal electronic book by the contents status control processing unit 512 to sell it the customer.

The contents status control processing unit 512 is a processing unit for setting a value for permitting the replay processing by a customer in the status information of the electronic book selected by the customer to generate the personal electronic book. The distribution information inspection processing unit 513 is a processing unit for permitting the storage processing in the vending machine 140 when a distribution information for the distribution-encrypted electronic book indicates the regular distribution route. The distribution information setting processing unit 514 is a processing unit for setting the distribution information, which indicates that the electronic book is sold by the vending machine 140 of the particular outlet, in the personal electronic book.

The programs for enabling the vending machine 140 to function as the distributed contents receiving processing unit 510, the sales processing unit 511, the contents status control processing unit 512, the distribution information inspection processing unit 513 and the distribution information setting processing unit 514 are recorded in a recording medium such as a CD-ROM, stored in a magnetic disk and so forth, and then are loaded in a memory for execution. The medium for recording the program is not limited to the CD-ROM but may be other recording means.

Figure 6:
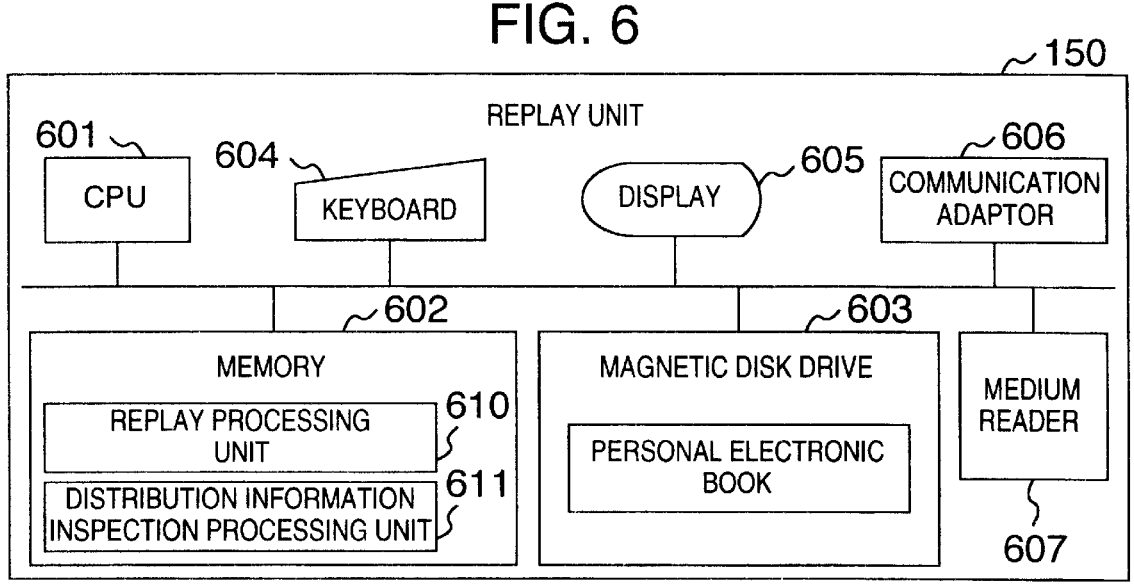
FIG. 6 is a diagram showing a general configuration of a replay unit 150 according to the embodiment.

FIG. 6 is a diagram showing a general configuration of the replay unit 150 according to the embodiment. As shown in FIG. 6, the replay unit 150 according to the embodiment includes a CPU 601, a memory 602, a magnetic disk drive 603, a keyboard 604, a display unit 605, a communication adaptor 606 and a medium writer 606.

The CPU 601 is a control unit for controlling the whole operation of the replay unit 150. The memory 602 is a storage unit for loading the various types of processing programs and data for controlling the operation of the replay unit 150. The magnetic disk drive 603 is a storage unit for storing the various types of processing programs mentioned above and data of electronic books and so forth.

The keyboard 604 is an input device for inputting operating instructions and so forth to the replay unit 150. The display unit 605 is an output device for displaying the operating conditions of the replay unit 150 and so forth. The communication adaptor 606 is an adaptor for communicating with other devices. The medium writer 607 is a device for reading a purchased personal electronic book from a medium.

The replay unit 150 further includes a replay processing unit 610 and a distribution information inspection processing unit 611.

The replay processing unit 610 is a processing unit for displaying the contents of the personal electronic book when the status information set in the personal electronic book indicates the value for permitting the replay unit 150 to perform the replay processing. The distribution information inspection processing unit 611 is a processing unit permitting the replay processing in the replay unit 150 when the distribution information of the personal electronic book indicates the regular distribution route.

The programs for enabling the replay unit 150 to function as the replay processing unit 610 and the distribution information inspection processing unit 611 are recorded in a recording medium such as a CD-ROM, stored in a magnetic disk and so forth, and then are loaded in a memory for execution. The medium for recording the program is not limited to the CD-ROM but may be other recording medium.

Now, an explanation will be given of the process for digitizing a book owned by a publisher and generating an electronic book, the replay of which is limited, in the digital contents distribution system according to the embodiment.

Figure 7:
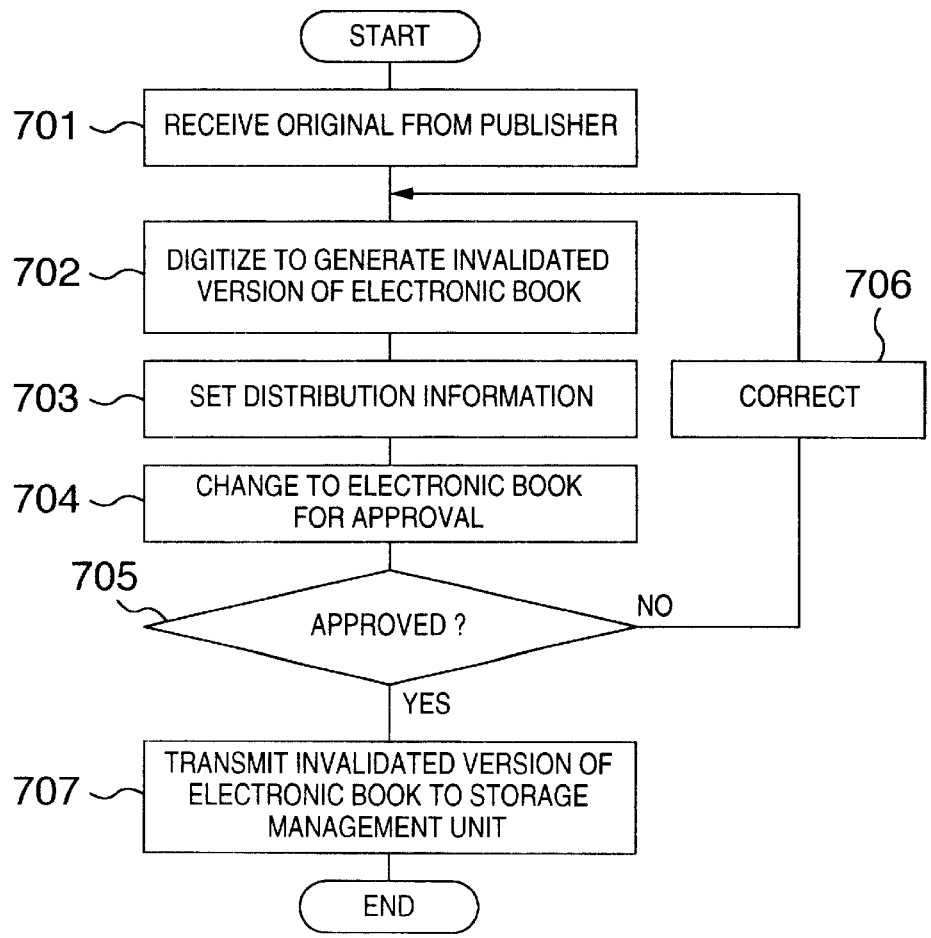
FIG. 7 is a flowchart showing the processing steps of a digitizing processing unit 210 according to the embodiment.

FIG. 7 is a flowchart showing the processing steps of the digitizing processing unit 210 according to the embodiment. After receiving an original from a publisher in step 701, the digitizing processing unit 210 of the digitizing unit 100 digitizes the received original to generate an electronic book in step 702. Then, the status information for prohibiting the replay processing of all the electronic books is set by the contents status control processing unit 211 to generate an invalidated version of electronic book. Also, a commodity information on the original is input to generate the commodity information corresponding to the invalidated version of electronic book.

Figure 8:
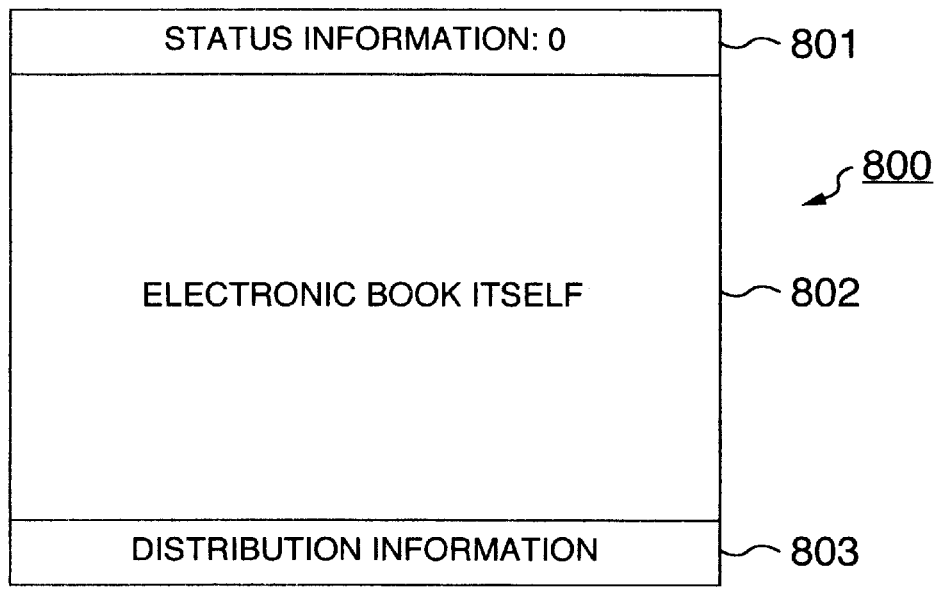
FIG. 8 is a diagram showing an example of an invalidated version of electronic book according to the embodiment.

FIG. 8 is a diagram showing an example of the invalidated version of electronic book according to the embodiment. As shown in FIG. 8, the electronic book 800 according to the embodiment includes a status information 801, an electronic book itself 802 and a distribution information 803.

The status information 801 is information for controlling the replay processing of the electronic book 800. The electronic book itself 802 is the digital contents itself of the electronic book 800. The distribution information 803 is information for indicating a transmission source of the electronic book 800.

As shown in FIG. 8, digit "0" is set in the status information 801 of the electronic book 800 as information prohibiting the replay processing of all the electronic books. The electronic book itself 802 is generated in a format defined by the application program for replaying the electronic book 800, and constitutes an application container described in an intermediate language or a binary notation.

In step 703, the distribution information setting processing unit 212 sets the distribution information, which indicates that the digitization is performed in the digitizing unit 100 of the digitizing center, in the invalidated version of electronic book generated by the digitization.

In step 704, the contents status control processing unit 211 sets the status information, which permits the replay processing in the publisher owing the original of the electronic book, in the invalidated version of electronic book generated as described above to generate an electronic book for approval. Then, the contents status control processing unit 211 transmits the electronic book for approval to the approval unit 110 of the publisher to wait for a response from the approval processing unit 310.

Figure 9:
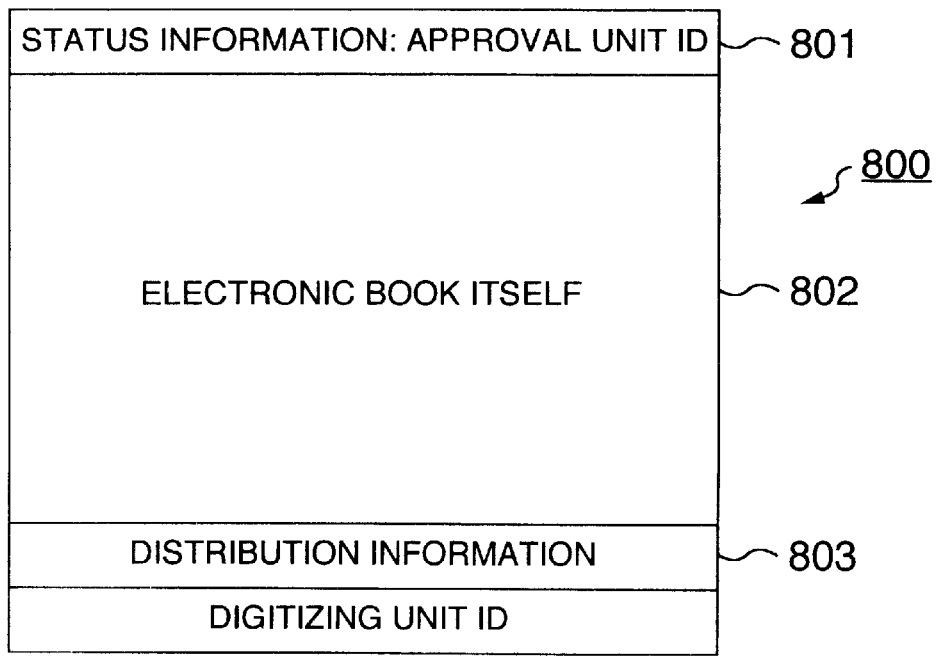
FIG. 9 is a diagram showing an example of an electronic book for approval according to the embodiment.

FIG. 9 is a diagram showing an example of the electronic book for approval according to the embodiment. As shown in FIG. 9, an "approval unit ID" is set in the status information 801 of the electronic book 800 as information for permitting the replay processing in the publisher. Also, an ID of the digitizing unit 100 is set in the distribution information 803 as information for indicating that the electronic book is digitized in the digitizing unit 100.

The IDs set in the status information include an approval unit ID using the device serial number of the approval unit 110 and so forth, a dealer designating ID predetermined by the digitizing center, a user designating ID predetermined by the publisher, a public key, a password of ticket type, etc. In the case of a trial version, a time limit is set. In the case where mere validation is sufficient, simple bit information like "1" is set in the status information 801.

Figure 10:
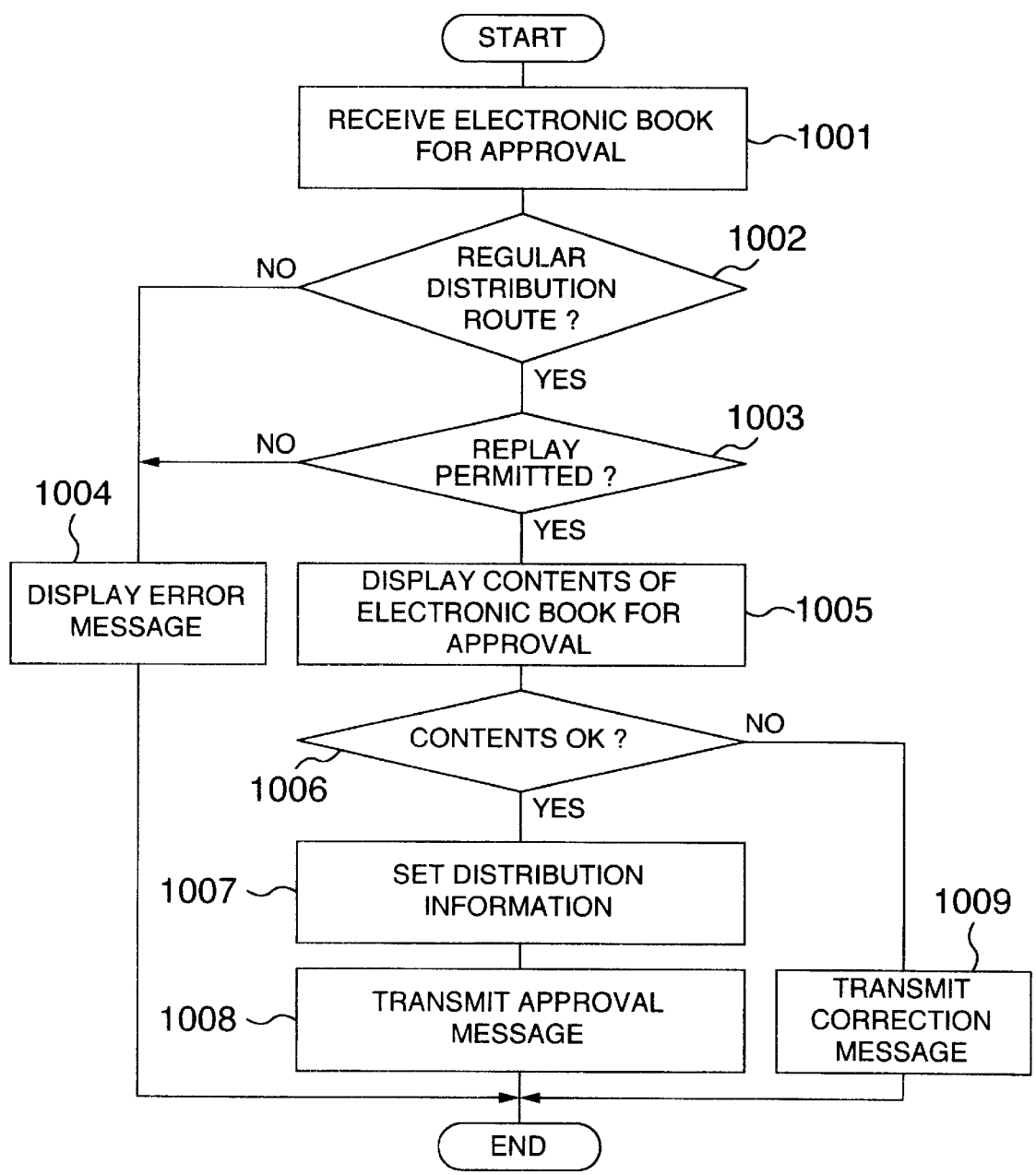
FIG. 10 is a flowchart showing the processing steps of an approval processing unit 310 according to the embodiment.

FIG. 10 is a flowchart showing the processing steps of the approval processing unit 310 according to the embodiment. In step 1001, the approval processing unit 310 of the approval unit 110 receives the electronic book for approval generated in the digitizing unit 100.

In step 1002, the distribution information inspection processing unit 312 checks whether the regular distribution route is established by reference to the distribution information set in the electronic book for approval. When the regular distribution route is established, i.e. when the distribution information of the digitizing unit 100 requested to digitize is set, the process proceeds to step 1003. On the other hand, when the regular distribution route is not established, an error message is displayed in step 1004 and then the process is terminated.

In step 1003, the replay processing unit 311 checks whether the replay processing in the approval unit 110 is permitted by reference to the status information set in the electronic book for approval. When the replay processing is permitted, the process proceeds to step 1005 to display the contents of the electronic book for approval on the display unit 305. On the other hand, when the replay processing is not permitted, the error message is displayed in step 1004 and then the process is terminated.

In step 1006, the approval processing unit 310 accepts the input from an operator. When the operation contents input by the operator is for approving the contents of the electronic book for approval, the distribution information which indicates that the approval is granted in the approval unit 110 of the publisher is set in the electronic book for approval by the distribution information setting processing unit 313 in step 1007. Then, the electronic book for approval and the approval message are transmitted to the digitizing unit 100 in step 1008.

Figure 11:
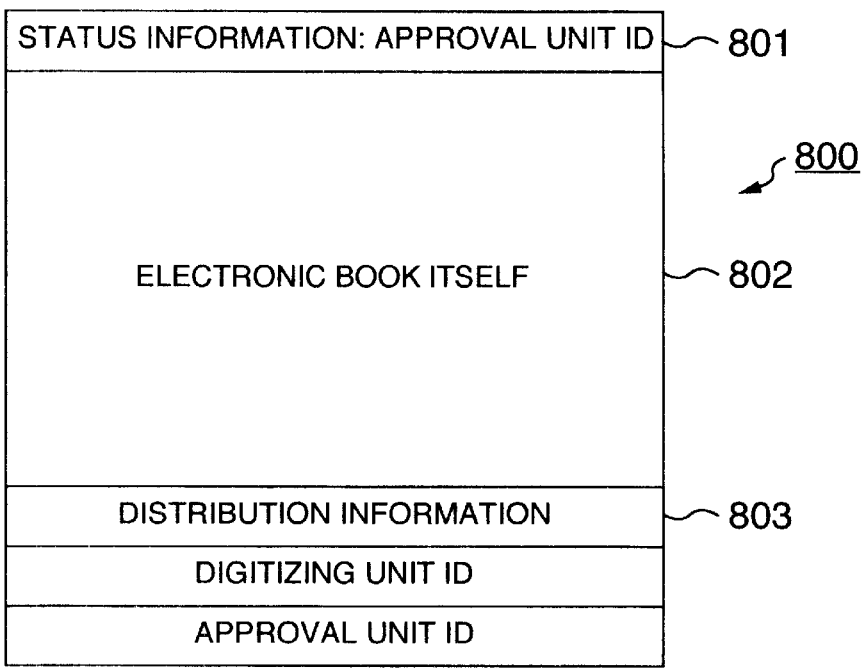
FIG. 11 is a diagram showing an example of an approved electronic book for approval which is approved in the approval unit 110 according to the embodiment.

FIG. 11 is a diagram showing an example of the electronic book for approval which is approved by the approval unit 110 according to the embodiment. As shown in FIG. 11, the ID of the approval unit 110 is set in the distribution information 803 as information which indicates that the approval is granted by the approval unit 110.

When the operation contents input from the operator in step 1006 are for instructing the electronic book for approval to be corrected, the process proceeds to step 1009 to transmit the correction contents input by the operator to the digitizing unit 1000 as a correction message.

In step 705, the digitizing processing unit 210 of the digitizing unit 100 checks the response contents from the approval unit 110 of the publisher. When the generated electronic book is to be corrected, the correction processing is performed in step 706, and then the process returns to step 702 where the digitization and subsequent processing are performed. When the contents of the generated electronic book for approval are approved, the process proceeds to step 707. In the step, the status information of the electronic book for approval returned from the publisher is changed to the value for totally prohibiting the replay processing to generate the invalidated version of electronic book. The invalidated version of electronic book thus generated and the commodity information thereof are transmitted to the storage management processing unit 410 of the storage management unit 120.

Figure 12:
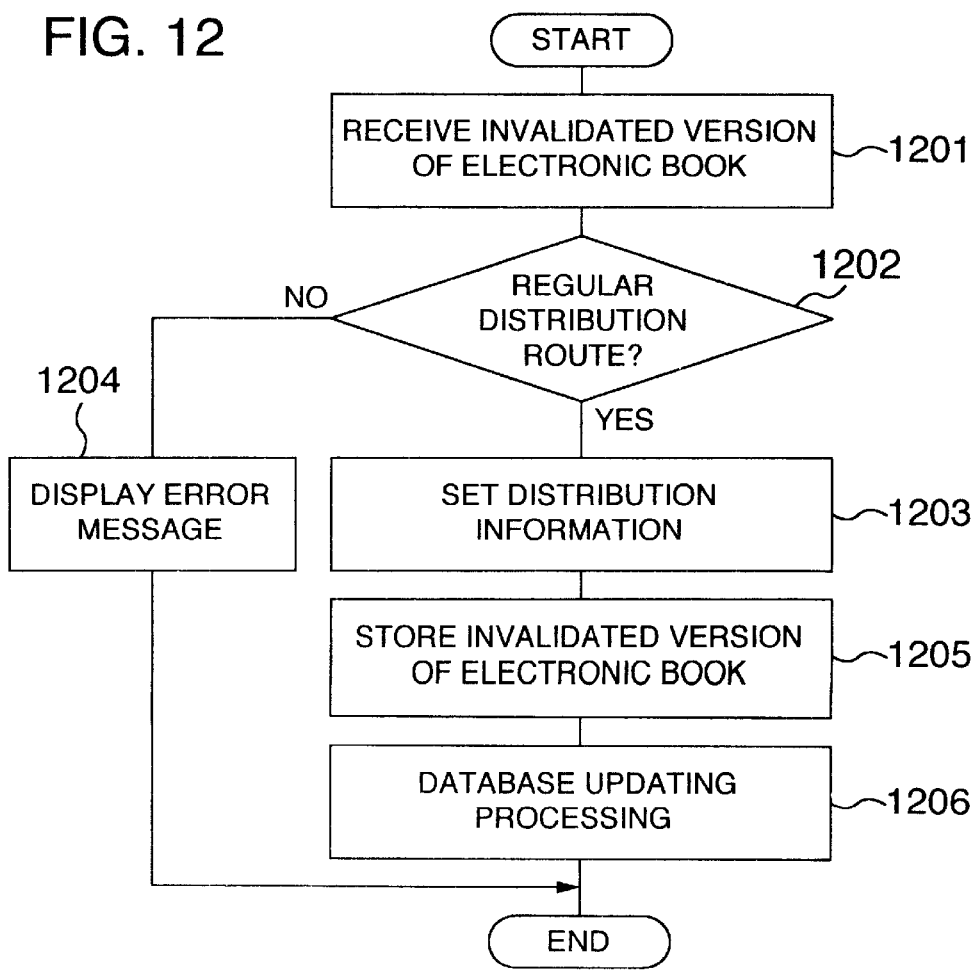
FIG. 12 is a flowchart showing the processing steps of a storage management processing unit 410 according to the embodiment.

FIG. 12 is a flowchart showing the processing steps of the storage management processing unit 410 according to the embodiment. In step 1201, the storage management processing unit 410 of the storage management unit 120 receives the invalidated version of electronic book and the commodity information thereof transmitted from the digitizing unit 100.

In step 1202, the distribution information inspection processing unit 413 checks whether or not the regular distribution route is established by reference to the distribution information set in the invalidated version of electronic book. When the regular distribution route is established, i.e. when the distribution informations of the digitizing unit 100 and approval unit 110 are set, the process proceeds to step 1203. On the other hand, when the regular distribution route is not established, an error message is displayed in step 1204 and then the process is terminated.

In step 1203, the distribution information setting processing unit 414 sets the distribution information, which indicates that the storage is going on in the storage management unit 120 of the storage management center, in the received invalidated version of electronic book. In step 1205, the invalidated version of electronic book and the commodity information thereof are stored in the database within the magnetic disk unit 403. In step 1206, the database updating processing such as an updating of index is performed.

Now, an explanation will be given of the processing in the digital contents distribution system according to the embodiment. In the processing, the invalidated version of electronic books stored in the storage management unit 120 are encrypted to be distributed to the vending machine 140, and then the selling of the electronic book is performed.

Figure 13:
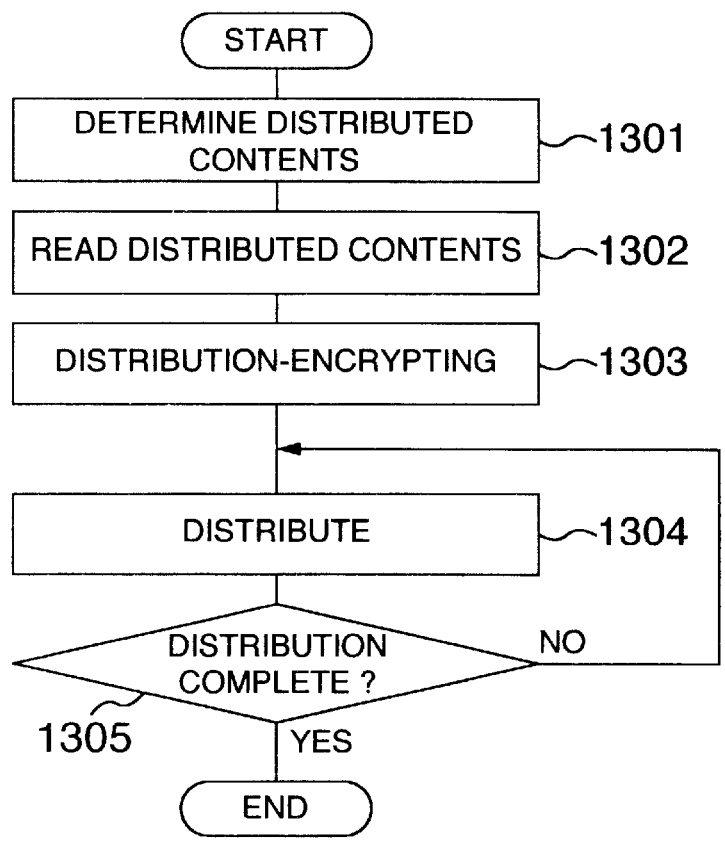
FIG. 13 is a flowchart showing the processing steps of a distribution control processing unit 411 according to the embodiment.

FIG. 13 is a flowchart showing the processing steps of the distribution control processing unit 411 according to the embodiment. In step 1301, the distribution control processing unit 411 of the storage management unit 120 generates a distribution schedule for distributing the invalidated version of electronic book to the vending machine 140. In step 1302, the invalidated version of electronic book and the commodity information thereof distributed according to the distribution schedule are read out.

In step 1303, the distribution control processing unit 411 performing the encrypting processing for distribution to the read-out invalidated version of electronic book to generate a distribution-encrypted electronic book. Then, the distribution processing unit 412 is instructed to distribute the distribution-encrypted electronic book in accordance with the distribution schedule. In step 1304, the distribution processing unit 412 distributes the distribution-encrypted electronic book and the commodity information thereof to each of the vending machines 140 in accordance with the distribution schedule.

In step 1305, it is checked whether or not the distribution-encrypted electronic book and the commodity information thereof are distributed to each of the vending machines 140 in which the distribution processing according to the distribution schedule is performed. When the distribution to each of the vending machines is not completed, the process returns to step 1304 and then the process continues. On the other hand, when the distribution to each of the vending machines is completed, the process is terminated. The distribution of the distribution-encrypted electronic book and the commodity information thereof to each of the vending machines in which the distribution processing is performed in accordance with the distribution schedule may alternatively be performed at a time by performing the simultaneous broadcasting to a plurality of vending machines 140 utilizing a communication satellite or the like.

Figure 14:
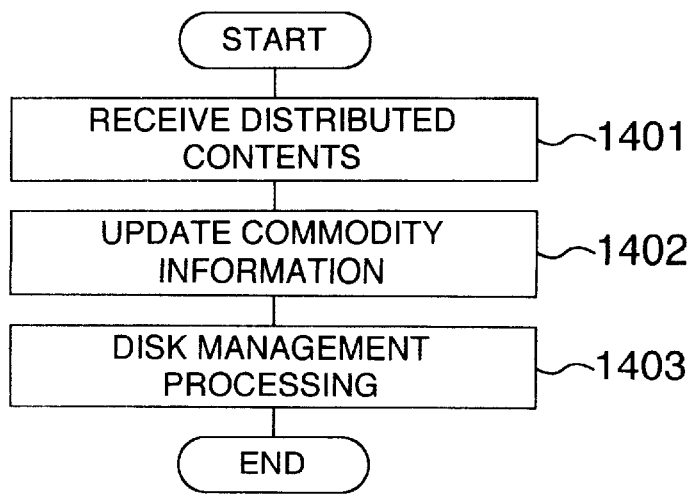
FIG. 14 is a flowchart showing the processing steps of a distributed contents receiving processing unit 510 according to the embodiment.

FIG. 14 is a flowchart showing the processing steps of the distributed contents receiving processing unit 510 according to the embodiment. In step 1401, the distributed contents receiving processing unit 510 of the vending machine 140 receives the distribution-encrypted electronic book and the commodity information thereof distributed from the storage management unit 120 to store them in the magnetic disk drive 503. In step 1402, the received commodity information is added to the previous commodity information, and data used in a retrieval processing in which the customer selects the electronic book for purchase is updated. In step 1403, the available capacity of the magnetic disk drive 503 is checked, and in accordance with the value of the available capacity, data not used for the sales recently are deleted or otherwise the disk is controlled.

Figure 15:
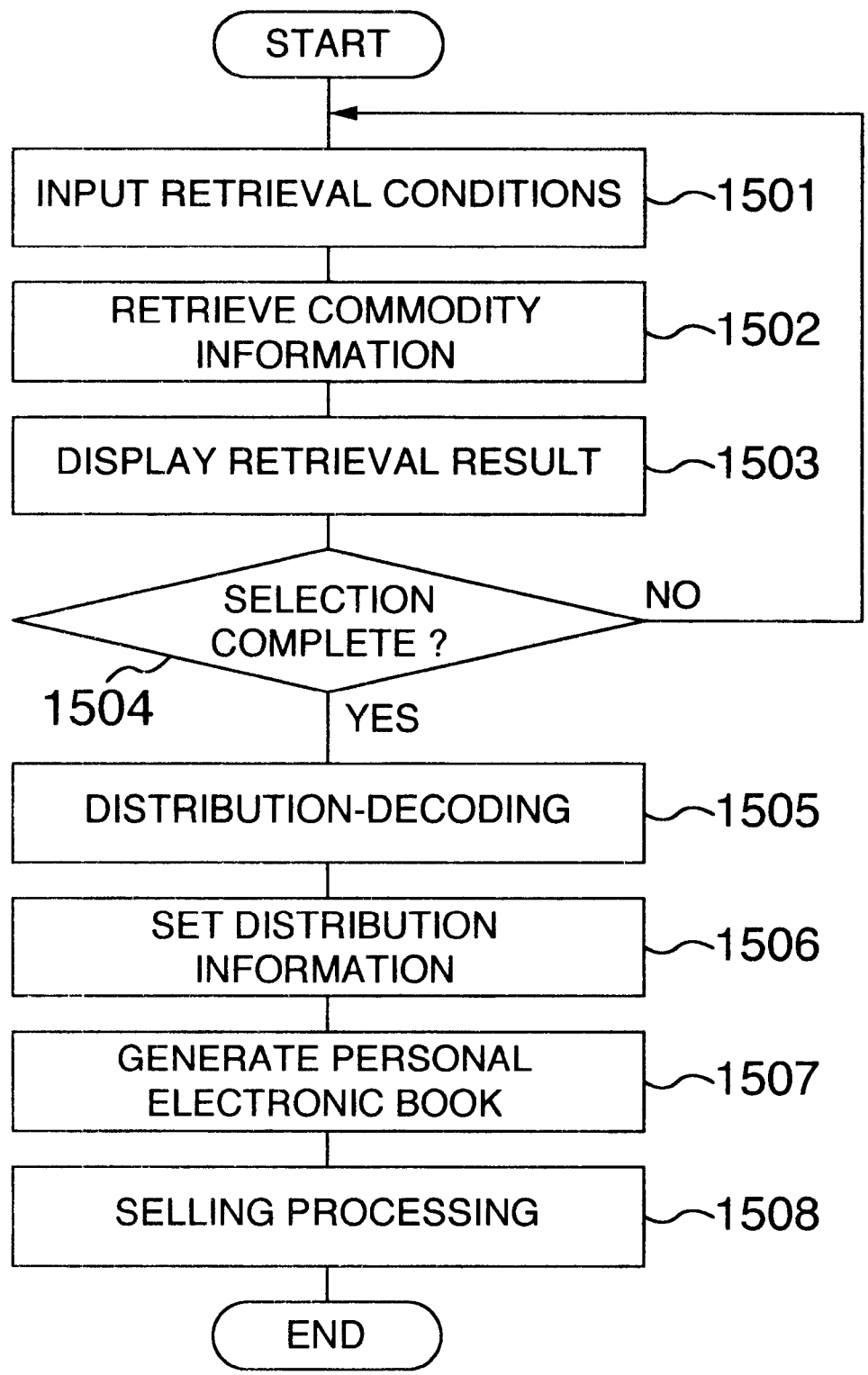
FIG. 15 is a flowchart showing the processing steps of a sales processing unit 511 according to the embodiment.

FIG. 15 is a flowchart showing the processing steps of the sales processing unit 511 according to the embodiment. In step 1501, the sales processing unit 511 of the vending machine 140 displays the GUI (graphical user interface) for retrieving the electronic book on the display unit 505 to receive the retrieval conditions input by the customer. Upon entry of the retrieval conditions by the customer, the commodity information in the vending machine 140 is retrieved in step 1502 to read out the commodity information of the electronic book which meets the received retrieval conditions. In step 1503, the commodity information of the electronic book obtained as the result of retrieval is displayed on the display unit 505 to receive the selection of the electronic book by the customer.

In step 1504, it is checked whether or not a specific electronic book in the commodity information on display is selected by the customer. When such an electronic book is selected, the process proceeds to step 1505. On the other hand, when a repeated retrieval is designated, the process returns to step 1501 to receive the input of the retrieval conditions again.

In step 1505, the invalidated version of electronic book is generated by decoding the selected specific distribution-encrypted electronic book among the distributed distribution-encrypted electronic books. In step 1506, the distribution information setting processing unit 514 sets the distribution information, which indicates that the electronic book is sold in the vending machine 140 of the particular outlet, in the invalidated version of electronic book.

In step 1507, the contents status control processing unit 512 sets the status information for permitting the replay processing by the customer in the invalidated version of electronic book to generate the personal electronic book. Also, the encryption processing can be conducted at the same time that the personal electronic book is generated. The IDs set in the status information include the serial number of the replay unit 150 of the customer, a dealer designating ID predetermined by the outlet, a user designating ID predetermined by the customer, a public key, a password of ticket type, etc. In the case of a trial edition, a time limit is set. In the case where mere validation is sufficient, simple bit information such as "1" may be set in the status information.

In step 1508, the generated personal electronic book is copied to a medium by the medium writer 507, or is downloaded to the replay unit 150 through a communication cable or a communication line such as an internet to be sold to the customer. For reading the personal electronic book sold in the manner described above, the replay unit 150 is used.

Figure 16:
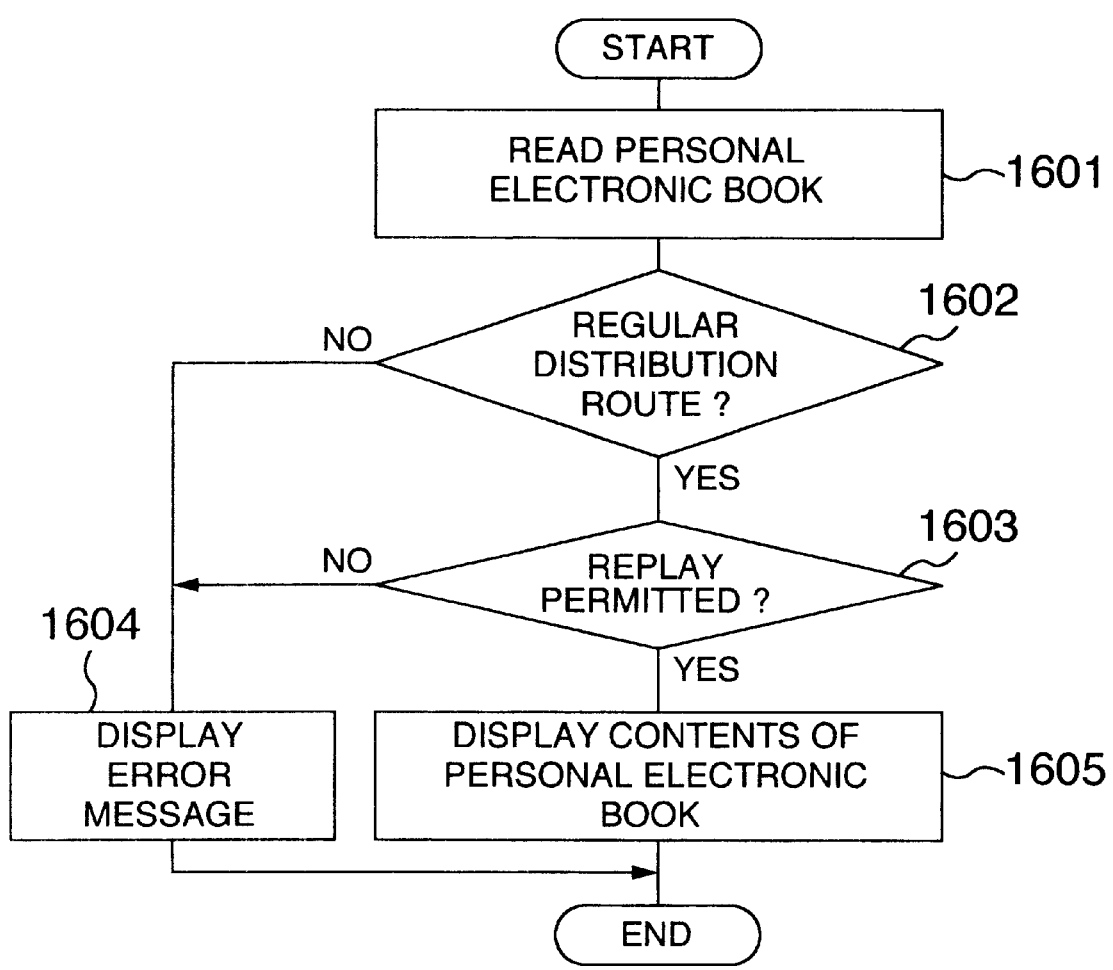
FIG. 16 is a flowchart showing the processing steps of a replay processing unit 610 according to the embodiment.

FIG. 16 is a flowchart showing the processing steps of the replay processing unit 610 according to the embodiment. In step 1601, the replay processing unit 610 of the replay unit 150 reads the sold personal electronic book by accessing the medium having the personal electronic book written therein or the downloaded personal electronic book file.

In step 1602, the distribution information inspection processing unit 611 checks whether or not the regular distribution route is established by reference to the distribution information set in the personal electronic book. When the regular distribution route is established, i.e. when the distribution informations of the digitizing unit 100, the approval unit 110, the storage management unit 120 and the vending machine 140 are set, the process proceeds to step 1603. In contrast, when the regular distribution route is not established, an error message is displayed in step 1604 and then the process is terminated.

In step 1603, it is checked whether or not the customer is permitted the replay processing in the replay unit 150 owned by the customer by comparing with the personal ID stored in the replay unit 150 referring to the status information set in the personal electronic book. When the replay processing is permitted, the process proceeds to step 1605, where the operating instruction from the customer is input to display the contents of the personal electronic book on the display unit 605. On the other hand, when the replay processing is not permitted, an error message is displayed in step 1604 and then the process is terminated.

As described above, according to the embodiment, the electronic books are stored in the form of the invalidated version. When it is validated, the validation is performed only for a specific user. Thus, those who are not permitted to use the electronic book cannot read and use the contents thereof even they are successful in copying, removing or downloading the electronic book. Also, the replay processing of the electronic book is controlled in accordance with the value of the status information set in the electronic book. Thus, the user permitted to replay it can be easily changed by changing the value of the status information set in the electronic book for the benefit of the publisher or the customer.

As described above, in the system for preventing the illegal use of digital contents according to the embodiment, the replay processing of the digital contents is controlled in accordance with the value of the status information set in the digital contents. Therefore, the illegal use of the digital contents in the various types of shopping centers and retail outlets can be prevented.

According to the present invention, the replay processing of digital contents is controlled in accordance with the value of the status information set in the digital contents, so that the illegal use of the digital contents in the various types of shopping centers and retail outlets can be prevented.

What is claimed is:

1. A method of preventing an illegal use of digital contents, comprising the steps of:

setting a status information for controlling a replay processing of digital contents, in said digital contents;

controlling the replay processing of said digital contents in accordance with a first value of said set status information; and storing an invalidated version of digital contents with said status information which is set to a second value for totally prohibiting the replay processing.

2. A method according to claim 1, further comprising the steps of:

setting a distribution information, which indicates a source of said digital contents, in said digital contents; and permitting a processing at a receiving end when said distribution information of said digital contents indicates a regular distribution route.

3. A method according to claim 1, wherein said step of setting said status information sets said status information to a third value for permitting said replay processing by a specific user to generate a validated version of digital contents;

wherein said step of controlling said replay processing enables said specific user to perform said replay processing when said status information set in said validated version of digital contents indicates said third value for permitting said replay processing by said specific user; and wherein said method further comprising the step of:

storing said invalidated version of digital contents with said status information which is set to a second value for totally prohibiting said replay processing.

4. A method according to claim 3, further comprising the steps of:

setting a distribution information, which indicates a source of said digital contents, in said digital contents; and permitting a processing at a receiving end when said distribution information of said digital contents indicates a regular distribution route.

5. A method according to claim 3, further comprising the steps of:

setting a distribution information, which indicates a source of said digital contents, in said digital contents; and permitting a processing at a receiving end when said distribution information of said digital contents indicates a regular distribution route.

6. A method preventing an illegal use of digital contents, comprising the steps of:

setting a status information for controlling a replay processing of digital contents, in said digital contents;

controlling the replay processing of said digital contents in accordance with a first value of said set status information;

setting a distribution information, which indicates a source of said digital contents, in said digital contents; and permitting a processing at a receiving end when said distribution information of said digital contents indicates a regular distribution route.

* * * * *